(12) United States Patent
Viola et al.

(10) Patent No.: US 11,639,705 B2
(45) Date of Patent: *May 2, 2023

(54) VAPOR CAPTURE ELEMENT FOR AN AIR INTAKE SYSTEM OF AN INTERNAL COMBUSTION ENGINE

(71) Applicant: GM GLOBAL TECHNOLOGY OPERATIONS LLC, Detroit, MI (US)

(72) Inventors: Michael B. Viola, Macomb Township, MI (US); Anne M. Dailly, West Bloomfield, MI (US); Miles K. Maxey, Ann Arbor, MI (US); Timothy E. McCarthy, Grand Blanc, MI (US); Darrell W. Burleigh, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 191 days.

This patent is subject to a terminal disclaimer.

(21) Appl. No.: 17/176,681

(22) Filed: Feb. 16, 2021

(65) Prior Publication Data
US 2022/0260044 A1 Aug. 18, 2022

(51) Int. Cl.
*B01D 53/04* (2006.01)
*F02M 25/08* (2006.01)
(Continued)

(52) U.S. Cl.
CPC ... *F02M 35/02441* (2013.01); *B01D 46/0036* (2013.01); *B01D 53/0407* (2013.01); *B01D 53/0454* (2013.01); *B01J 20/226* (2013.01); *B01D 2253/204* (2013.01); *B01D 2257/702* (2013.01); *B01D 2259/4516* (2013.01); *B01D 2279/60* (2013.01)

(58) Field of Classification Search
CPC ........... B01D 46/0036; B01D 53/04; B01D 53/0407; B01D 53/0454; B01D 2253/204; B01D 2257/702; B01D 2279/60; B01D 2259/4516; B01J 20/226; F02M 35/02441; F02M 25/08; F02M 25/0854
USPC ...... 95/146; 96/108, 115, 147; 123/518, 519
See application file for complete search history.

(56) References Cited

U.S. PATENT DOCUMENTS

| 4,403,587 A | 9/1983 | Mizuno et al. |
| 5,347,971 A | 9/1994 | Kobayashi et al. |

(Continued)

FOREIGN PATENT DOCUMENTS

WO 2010144360 A2 12/2010

OTHER PUBLICATIONS

Schneeman, Bon, Schwedler; Senkovska, Kaskel, Fischer; Flexible metal-organic frameworks;Royal Society of Chemistry 2014, 43, 6062-6096.

*Primary Examiner* — Frank M Lawrence, Jr.
(74) *Attorney, Agent, or Firm* — Quinn IP Law

(57) ABSTRACT

An air intake system for an internal combustion engine is described, and includes a vapor capture element disposed in an interior portion of an air intake system. The vapor capture element includes a flexible Metal Organic Framework (MOF) material, wherein the flexible MOF material is reversibly controllable to a first state and to a second state in response to a control stimulus. The flexible MOF material is configured to adsorb hydrocarbon vapor when controlled to the first state and configured to desorb the hydrocarbon vapor when controlled to the second state.

20 Claims, 3 Drawing Sheets

(51) Int. Cl.
  *F02M 35/024*  (2006.01)
  *B01J 20/22*  (2006.01)
  *B01D 46/00*  (2022.01)

(56) References Cited

U.S. PATENT DOCUMENTS

| | | | |
|---|---|---|---|
| 6,835,237 B2 * | 12/2004 | Ishida | B01D 46/30 |
| | | | 96/135 |
| 7,553,352 B2 | 6/2009 | Mueller et al. | |
| 7,753,034 B2 | 7/2010 | Hoke et al. | |
| 9,050,885 B1 | 6/2015 | Dudar et al. | |
| 10,138,846 B1 | 11/2018 | Dudar | |
| 10,174,728 B2 | 1/2019 | Yamauchi et al. | |
| 10,378,462 B1 | 8/2019 | Hamad et al. | |
| 10,704,501 B2 | 7/2020 | Byrne et al. | |
| 11,230,997 B1 * | 1/2022 | Viola | F02M 35/0218 |
| 2002/0029693 A1 * | 3/2002 | Sakakibara | B01D 46/30 |
| | | | 55/385.3 |
| 2002/0059920 A1 | 5/2002 | Yoshioka et al. | |
| 2004/0118387 A1 * | 6/2004 | Lawrence | B01D 53/92 |
| | | | 123/518 |
| 2004/0211320 A1 | 10/2004 | Cain | |
| 2005/0000362 A1 * | 1/2005 | Bause | F02M 25/0854 |
| | | | 96/134 |
| 2007/0022880 A1 * | 2/2007 | Mizutani | B01D 46/0036 |
| | | | 96/136 |
| 2007/0079702 A1 * | 4/2007 | Hurley | F02M 35/046 |
| | | | 95/46 |
| 2008/0257160 A1 * | 10/2008 | Yoshida | F02M 35/024 |
| | | | 96/139 |
| 2010/0316538 A1 * | 12/2010 | Buelow | B01J 20/3223 |
| | | | 422/177 |
| 2012/0024158 A1 | 2/2012 | Makino et al. | |
| 2014/0076286 A1 | 3/2014 | Karim et al. | |
| 2014/0290611 A1 | 10/2014 | Abd Elhamid et al. | |
| 2015/0158378 A1 | 6/2015 | Dudar et al. | |
| 2017/0023503 A1 | 1/2017 | Rebinsky | |
| 2017/0067415 A1 | 3/2017 | Cai et al. | |
| 2018/0363594 A1 | 12/2018 | Byrne et al. | |
| 2020/0147586 A1 | 5/2020 | Ruettinger et al. | |
| 2021/0317803 A1 | 10/2021 | Cronin et al. | |

\* cited by examiner

VAPOR CAPTURE ELEMENT FOR AN AIR INTAKE SYSTEM OF AN INTERNAL COMBUSTION ENGINE

INTRODUCTION

A vehicle employing an internal combustion engine may emit volatile hydrocarbons from sources that may include an engine air intake system, a fuel delivery system, a fuel tank, and an exhaust gas recirculation (EGR) system. These emissions from the fuel tank and fuel delivery system may be captured employing an evaporative emissions control system that may include a canister that is filled with activated carbon.

New evaporative emission regulations for vehicles require control of emissions of substances, primarily hydrocarbons, from the vehicle under various vehicle operating conditions. By way of example, volatile hydrocarbons from several sources may collect in the air intake system during engine shutdown. There is a risk of such hydrocarbon leaking into the atmosphere during engine shutdown if not captured.

There is a need for an improved method, apparatus, and/or system for capturing volatile hydrocarbons that may collect in the air intake system.

SUMMARY

The concepts described herein provide a vapor capture element that is disposed in an air intake system of an internal combustion engine for evaporative emission control. The vapor capture element is arranged in an interior portion of an air intake system for an internal combustion engine. The vapor capture element is fabricated from a flexible Metal Organic Framework (MOF) material, wherein the flexible MOF material is a bistable material that is reversibly controllable to either a first state or a second state in response to a control stimulus. The flexible MOF material is able to adsorb hydrocarbon vapor when in the first state and able to desorb the hydrocarbon vapor when in the second state. The flexible MOF material is capable of adsorbing and desorbing hydrocarbon vapors in the air intake system. The vapor capture element is tunable for a specific system and is actively controllable in-use. Flexible MOFs are able to change their pore dimensions and/or other adsorption and desorption capabilities in response to an external stimulus to selectively adsorb and desorb hydrocarbon vapor components in the air intake system.

An aspect of the disclosure includes the control stimulus being a partial pressure, or an ambient temperature, or a light intensity, or an electrical signal, or an electro-magnetic signal.

Another aspect of the disclosure includes the flexible MOF material being configured to transform to tightly arranged, small pores that are capable of adsorbing the hydrocarbon vapor in the first state, and the flexible MOF material being configured to transform to having loosely arranged, large pores capable of desorbing hydrocarbon vapor in the second state.

Another aspect of the disclosure includes the flexible MOF material being a hybrid organic-inorganic material that is assembled by connection of secondary building blocks employing rigid organic ligands.

Another aspect of the disclosure includes the secondary building blocks being metal oxide clusters.

Another aspect of the disclosure includes the flexible MOF material being one of: MIL-53 Al (Aluminum terephthalate MOF), MIL-88 series (Iron (III) dicarboxylate MOFs), ZIF-8 (Zeolitic Imidazolate framework made by zinc ions coordinated by four imidazolate rings), Co(bdp) (Cobalt based MOF with $bdp^{2-}$=1,4-benzenedipyrazolate linker.

Another aspect of the disclosure includes the vapor capture element being disposed on an interior wall of an air filter housing.

Another aspect of the disclosure includes the vapor capture element being disposed upstream of an air filter element.

Another aspect of the disclosure includes the vapor capture element being disposed downstream of an air filter element.

Another aspect of the disclosure includes the vapor capture element having a planar surface, wherein the vapor capture element is disposed in the interior portion of the air intake system with an orientation of the planar surface that is parallel to a direction of an airflow path in the air intake system.

Another aspect of the disclosure includes an air intake system for an internal combustion engine that includes a vapor capture element that is disposed in an interior portion of an air intake system, and a controller. The vapor capture element is fabricated from a flexible Metal Organic Framework (MOF) material, wherein the flexible MOF material is reversibly controllable. The controller is operatively connected to the vapor capture element, and generates a control stimulus that is communicated to the vapor capture element. The control stimulus includes a first state and a second state. The flexible MOF material is configured to adsorb hydrocarbon vapor in response to the control stimulus being in the first state, and is configured to desorb hydrocarbon vapor in response to the control stimulus being in the second state.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
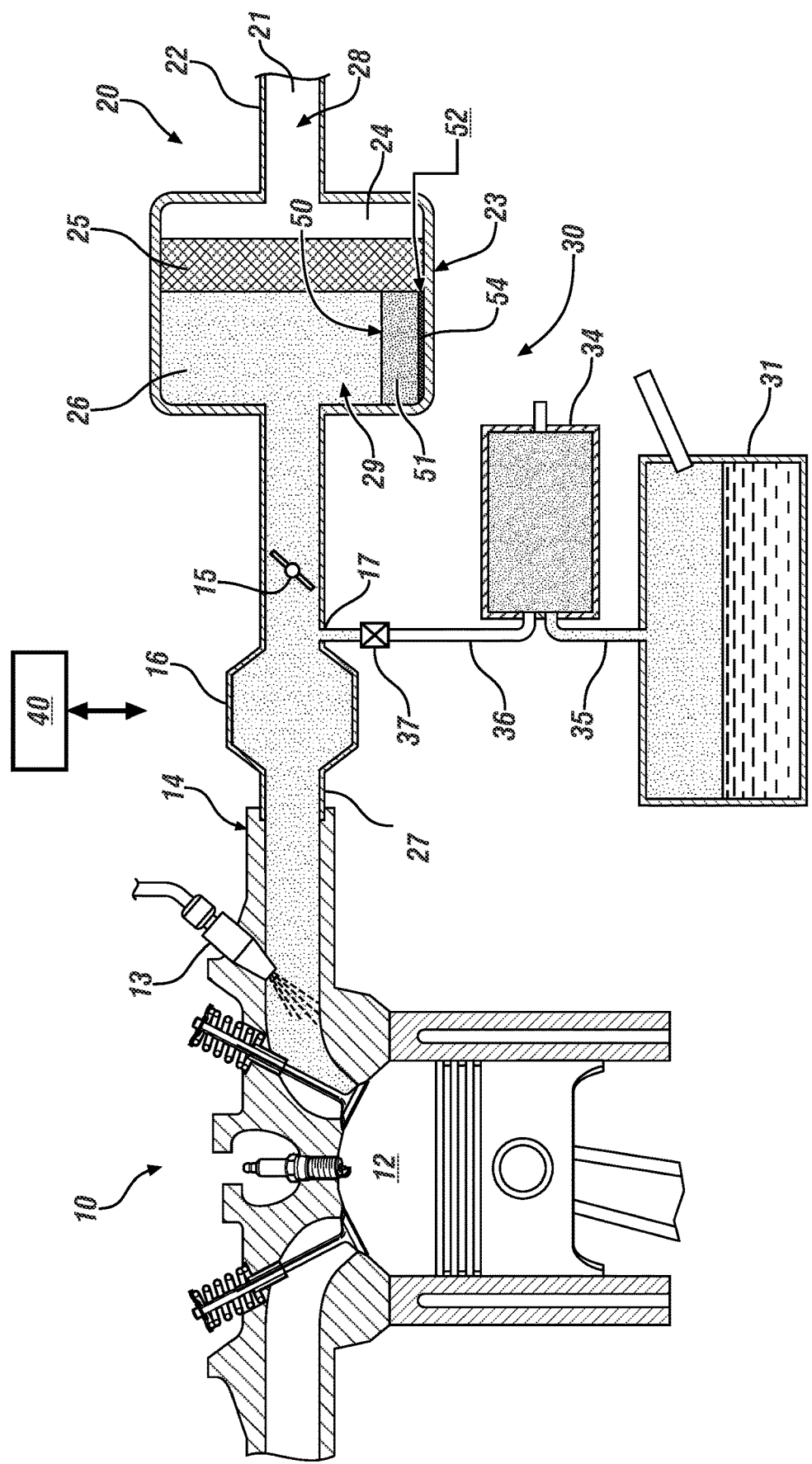
FIG. 1 schematically illustrates portions of an internal combustion engine and evaporative emissions system having a vapor capture element fabricated from a flexible Metal Organic Framework (MOF) material, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. Furthermore, there is no intention to be bound by an expressed or implied theory presented in the preceding technical field, background, brief summary or the following detailed description. It should be understood that throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

As employed herein, the term "upstream" and related terms refer to elements that are towards an origination of a flow stream relative to an indicated location, and the term "downstream" and related terms refer to elements that are away from an origination of a flow stream relative to an indicated location.

Figure 2:
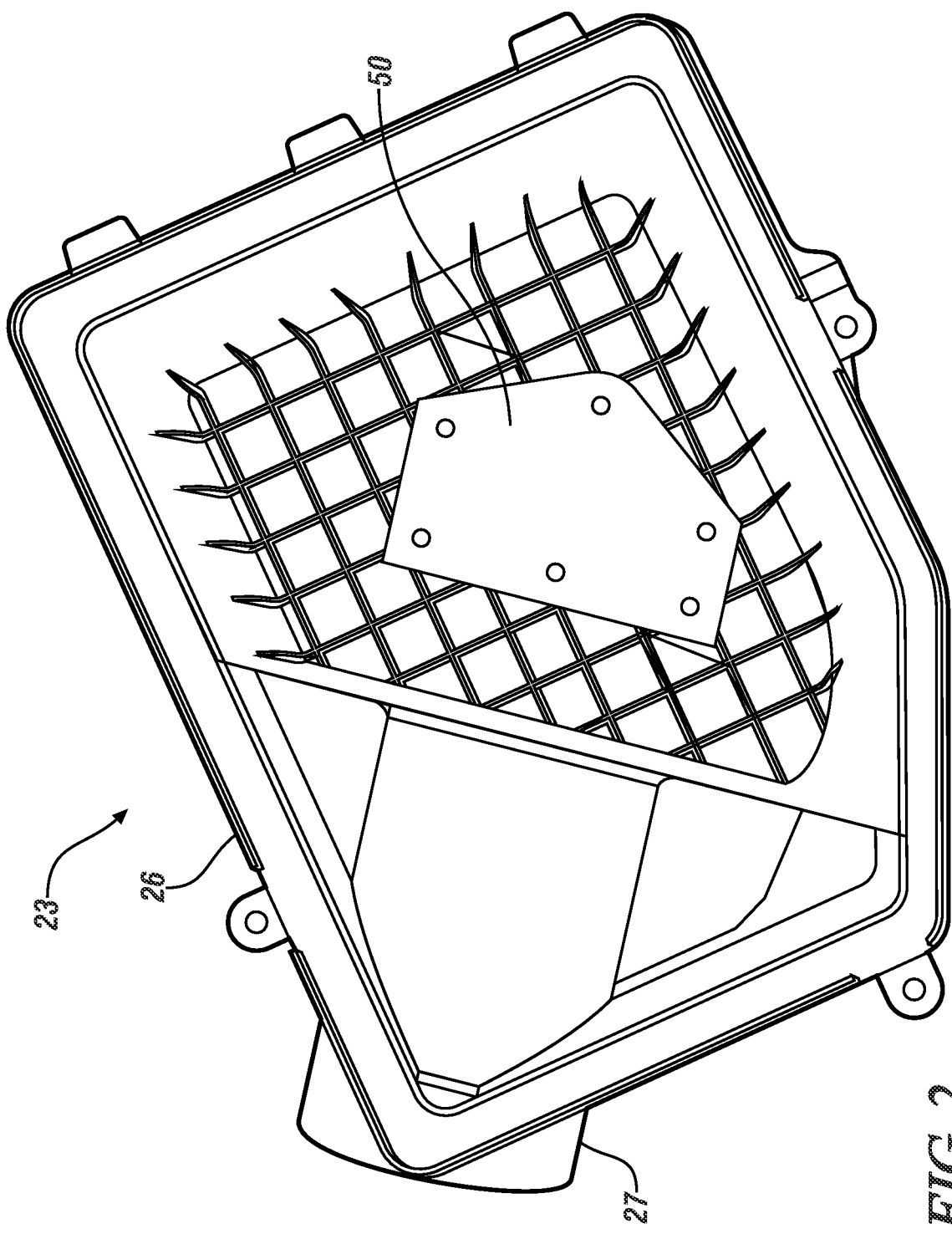
FIG. 2 schematically illustrates a portion of an air filter system including a filtered air housing of an air filter housing and a vapor capture element that is fabricated from a flexible MOF material, in accordance with the disclosure.

Referring to the drawings, wherein like reference numerals correspond to like or similar components throughout the several Figures, FIGS. 1 and 2, consistent with embodiments disclosed herein, schematically illustrate a portion of a multi-cylinder internal combustion engine 10 and fuel storage system 30 for a vehicle that includes an embodiment of a vapor capture element 50. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The illustrated portion of the internal combustion engine 10 includes a single combustion chamber 12 that is fluidly coupled to an air intake system 20, and an intake manifold 14. Elements of the internal combustion engine 10 include a fuel injector 13, throttle 15, and air flow sensor 16. The air intake system 20 includes a fresh air inlet 21 fluidly coupled to the intake manifold 14 via a fresh air duct 22, an air filter housing 23, and an intake manifold duct 27. The air filter housing 23 includes an inlet housing 24, an air filter element 25 and a filtered air housing 26. The fresh air inlet 21, fresh air duct 22, and inlet housing 24 of the air filter housing 23 form a fresh air side 28. The filtered air housing 26 of the air filter housing 23, the intake manifold duct 27, and the intake manifold 14 form a filtered air side 29. The vapor capture element 50 is disposed in the filtered air housing 26 of the air filter housing 23 on the filtered air side 29 between the air filter element 25 and the intake manifold 14.

The internal combustion engine 10 as shown is configured as a spark-ignition internal combustion engine with port fuel injection. The concepts described herein are not limited to such a configuration, and may instead be employed on another form of fuel injection, such as but not limited to a direct-injection system. Furthermore, the concepts described herein may also be applied to a compression-ignition engine.

The fuel storage system 30 includes a fuel storage tank 31 and an evaporative storage canister 34. The fuel storage system 30 supplies fuel via a fuel pump to an engine fuel distribution system that fluidly couples to engine fuel injectors, including illustrated fuel injector 13. The fuel storage tank 31 is fluidly coupled to the evaporative storage canister 34 via a vapor line 35. The evaporative storage canister 34 is fluidly coupled to the air intake system 20 at port 17 via a purge line 36 and a purge valve 37. The purge line 36 is fluidly coupled to the air intake system 20 on the filtered air side 29 downstream of the throttle 15 at or near the intake manifold 14.

A controller 40 is arranged to control operation of the internal combustion engine 10, including controlling the purge valve 37. The controller 40 is also in communication with and/or operatively connected to the vapor capture element 50, through which the controller 40 communicates a control stimulus 52 to the vapor capture element 50, in one embodiment.

The vapor capture element 50 is fabricated from a flexible Metal Organic Framework (MOF) material 51 that is capable of adsorbing and desorbing hydrocarbon material. In one embodiment, the vapor capture element 50 is formed by arranging the flexible MOF material 51 with a binder material. In one embodiment, the vapor capture element 50 is formed by depositing the flexible MOF material 51 onto a substrate. In one embodiment, the vapor capture element 50 is formed by integrating the flexible MOF material 51 into a thin film. In one embodiment, the vapor capture element 50 is formed by containing the flexible MOF material 51 into a sealed pouch, wherein the sealed pouch is fabricated with material that is porous to hydrocarbons.

In one embodiment, the vapor capture element 50 is arranged as a sheet with a flat planar surface. Alternatively, the vapor capture element 50 may be arranged as a sheet having a surface contour that is tubular, coiled, or wavy. Alternatively, the vapor capture element 50 may be arranged in a honeycombed surface. In one embodiment, the honeycombed surface may be oriented orthogonal to the direction of air flow. Alternatively, the vapor capture element 50 may be arranged as a sheet having a surface contour that is discontinuous, such as having a W-shape, a V-shape, an L-shape, an I-shape, a box shape, etc.

The vapor capture element 50 is disposed in an interior portion of the air filter housing 23 on the filtered air side 29, i.e., downstream of the air filter element 25. The vapor capture element 50 may be arranged as a flat planar sheet that is disposed in the filtered air housing 26 of the air filter housing 23 and affixed to a surface such as an interior wall. This arrangement is shown with reference to FIG. 2. In one embodiment, the vapor capture element 50 may be arranged as a flat planar sheet that is disposed in and affixed to the air filter element 25 in the filtered air housing 26 of the air filter housing 23. This arrangement is shown with reference to FIG. 1. Alternatively, the vapor capture element 50, when arranged with a planar surface, may be disposed in the interior portion of the air intake system 20 on the filtered air side 29, i.e., downstream of the air filter element 25 and with the planar orientation being disposed in parallel to a direction of an airflow path in the air intake system 20. In this embodiment, the vapor capture element 50 may be centrally arranged in the filtered air housing 26 of the air filter housing 23 or the intake manifold duct 27. Alternatively, there may be multiple vapor capture elements 50 that are disposed in individual runners of the intake manifold 14.

The air intake system 20 for the internal combustion engine 10 includes the vapor capture element 50 that is disposed in an interior portion of the air intake system 20, and the controller 40. The vapor capture element 50 is fabricated from the flexible MOF material 51, wherein the flexible MOF material 51 is bistable and reversibly controllable.

The controller 40 is operatively connected to the vapor capture element 50 via the control stimulus 52. The controller 40 generates the control stimulus 52 that is communicated to the vapor capture element 50. The control stimulus 52 includes a first state and a second state. In one embodiment, an actuator 54 is integrated into the vapor capture element 50 or is arranged proximal to the vapor capture element 50, and is controlled in response to the control stimulus 52 to either the first state or the second state. In one embodiment, the actuator 54 is an electrically resistive substrate, e.g., formed from carbon on which the flexible MOF material 51 is deposited, and can be controlled to either an on state or an off state in response to the control stimulus 52 to control the vapor capture element 50. In one embodiment, the actuator 54 is an electrically-powered heating element that is proximal to the flexible MOF material 51, and can be controlled to either an on state or an off state in response to the control stimulus 52 to control the vapor capture element 50.

The flexible MOF material 51 has the characteristics of framework flexibility and dynamic response, which distinguishes it from other porous materials such as zeolites and activated carbons. The flexible MOF material 51 has an intrinsic ability to show different structural transformations or dynamic behaviors in response to the control stimulus 52.

The flexible MOF material 51 is a class of MOF material that exhibits a dynamic change of pore dimensions in response to an external stimulus. In accordance with the construction natures and features, the flexible MOF material 51 can show diverse types and magnitudes of structural dynamism. This many include expansion and contraction of pore diameter, also referred to as a breathing mechanism. The breathing mechanism may be triggered by external chemical stimuli, e.g., guest adsorption, desorption, and exchange. The breathing mechanism may instead be triggered by external physical stimuli, e.g., a change in temperature, light, and/or pressure.

The flexible MOF material 51 is configured to transform to have tightly arranged, small pores that are capable of adsorbing the hydrocarbon vapor when the control stimulus 52 is in the first state. Volatile hydrocarbon vapor that is contained within the filtered air side 29 of the air intake system 20 may precipitate onto the vapor capture element 50 and/or be adsorbed by the flexible MOF material 51 during an engine off state when the flexible MOF material 51 is controlled by the control stimulus to the first state.

The flexible MOF material 51 is configured to transform to have loosely arranged, large pores capable of desorbing hydrocarbon vapor when the control stimulus 52 is in the second state. The hydrocarbon vapor that is adsorbed by the flexible MOF material 51 during an engine-off state may be desorbed by the flexible MOF material 51 during an engine on state when the flexible MOF material 51 is controlled by the control stimulus 52 to the second state.

The flexible MOF material 51 may be one of or a combination of MIL-53 Al, MIL-88 series, ZIF-8, and/or Co(bdp). MIL-53 Al is an aluminum terephthalate MOF; MIL-88 series is an iron (III) dicarboxylate MOF; ZIF-8 is an zeolitic imidazolate framework that is made by zinc ions that are coordinated by four imidazolate rings; and Co(bdp) is a cobalt-based MOF with $bdp^{2-}$=1,4-benzenedipyrazolate linker.

Figure 3:
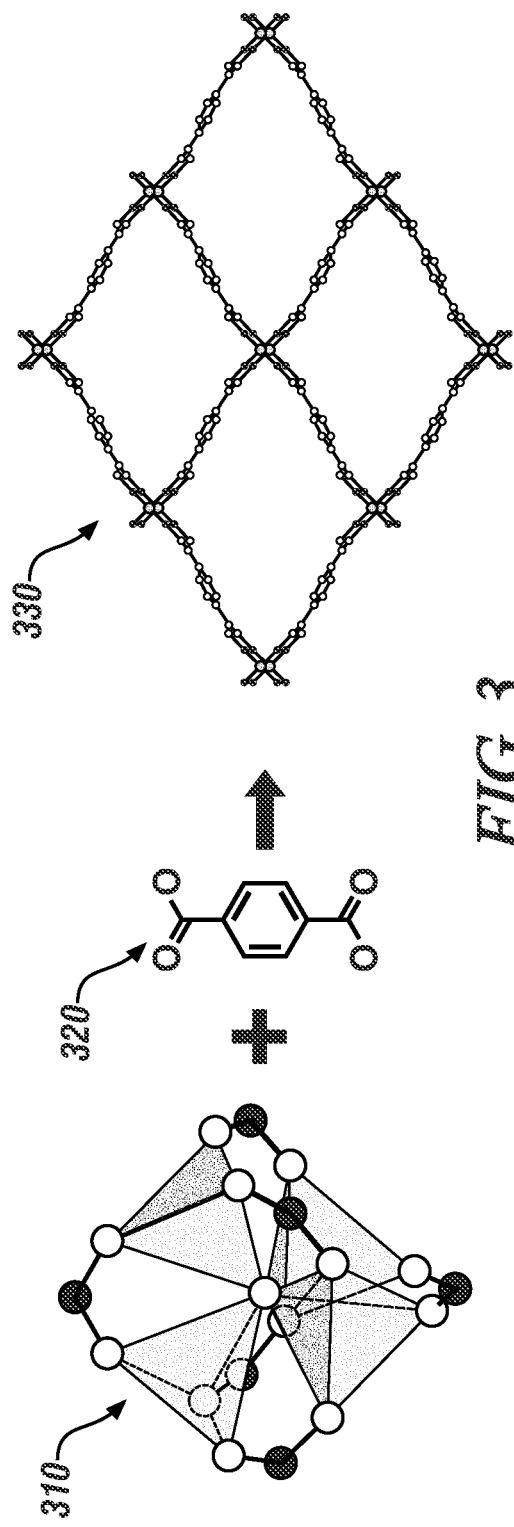
FIG. 3 pictorially shows an example flexible MOF material, in accordance with the disclosure.

FIG. 3 pictorially shows an example of a flexible MOF 330. The flexible MOF 330 is a hybrid organic-inorganic material that is assembled by connection of Secondary Building Blocks (SBU) 310 through rigid organic ligands 320. In one embodiment, the SBU 310 includes metal oxide clusters. The flexible MOF 330 may also be described as having interchangeable metal-containing nodes and carbon-based struts. Pore sizes and their chemical functionality can be tailored through control of the architecture, including being tailored to adsorb specific hydrocarbon molecules.

Figure 4:
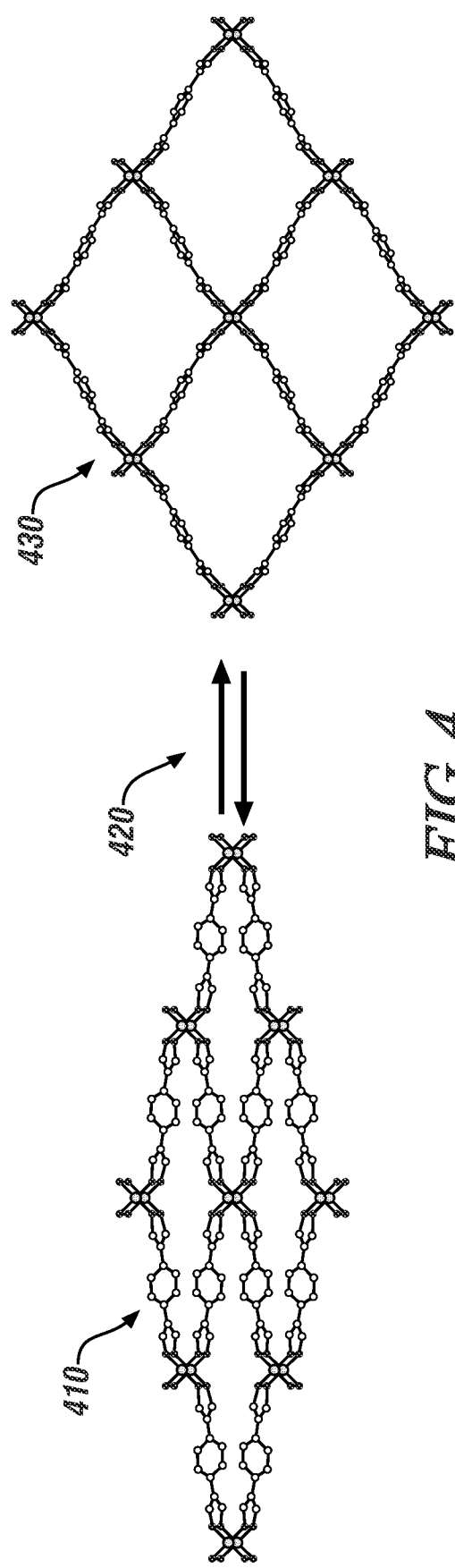
FIG. 4 pictorially illustrates a portion of an example flexible MOF material in a first, collapsed state and in a second, expanded state, and an associated control stimulus, in accordance with the disclosure.

FIG. 4 pictorially illustrates a portion of an embodiment of the flexible MOF material, e.g., Co(bdp), in a first, collapsed state 410 and in a second, expanded state 410, and an associated control stimulus 420. The flexible MOF material is reversibly controllable to a first state and to a second state in response to the control stimulus 420. As illustrated, the flexible MOF material is transformable to have tightly arranged, small pores that are capable of adsorbing hydrocarbon vapor when commanded to the first, collapsed state 410 by the control stimulus 420. As illustrated, the flexible MOF material is transformable to have loosely arranged, large pores that are capable of desorbing hydrocarbon vapor when commanded to the second, expanded state 430 by the control stimulus 420.

Referring again to FIG. 1, The flexible MOF material 51 may be arranged to be pressure-responsive, photo-responsive, thermo-responsive, or a combination, in one embodiment. The flexible MOF material may instead be arranged to be responsive to mechanical deformation.

The vapor capture element 50 is operatively connected to control stimulus 52. The control stimulus 52 may be one of or a combination of a partial pressure, an ambient temperature, or a light intensity, or an electrical signal, or an electro-magnetic signal.

In one embodiment, the control stimulus 52 is in the form of a control signal that may be actively generated by the controller 40. In such embodiments, the control stimulus 52 may be a constant, modulated, or pulsewidth-modulated electrical voltage or current signal, or an electro-magnetic signal.

In one embodiment, the control stimulus 52 is indirectly generated by one or more engine operating conditions and/or vehicle operating conditions. In such embodiments, the control stimulus 52 may be one or a combination of a partial pressure, or an ambient temperature, or a light intensity.

The vapor capture element 50 includes a flexible Metal Organic Framework (MOF) material 51.

The flexible MOF material 51 is reversibly controllable in a first state and a second state in response to the control stimulus 52.

The flexible MOF material 51 is configured to adsorb hydrocarbon vapor when controlled to the first state and configured to desorb hydrocarbon vapor when controlled to the second state.

Flexible MOFs have intrinsic abilities to show different structural transformations or dynamic behaviors toward external stimuli. Flexible MOFs can store greater amount of hydrocarbon vapors than similarly sized (by volume) devices employed activated carbon.

Through proper design, the HC adsorber employing the flexible MOF material 51 and located in the air intake system can quickly adsorb or desorb hydrocarbon vapors in response the control stimulus 52. It would also display less of a heel which is a permanent loss of vapor capture, as compared to activated carbon based HC-adsorbers. The flexible MOF material has tightly arranged, small pores that are capable of adsorbing hydrocarbon vapor in the first state, and the flexible MOF material having loosely arranged, large pores capable of desorbing hydrocarbon vapor in the second state.

Compositions of gasoline are a combination of alkanes ($C_4$-$C_{12}$) and aromatics (alkylbenzenes, indanes, naphthalenes) in the boiling range of approximately 35-200° C., and one or more oxygenates such as ethanol. In terms of blend compositions, gasoline may contain 55-77% saturated hydrocarbons, 9-36% aromatics, some unsaturated hydrocarbons and 10-15% ethanol. Gasoline vapor contains very volatile organic compounds (VVOCs), with n-butane, isobutane, n-pentane and 2-methylbutane collectively accounting for 60-77 wt %. The most abundant alkane in evaporated gasoline is n-butane. Headspace compositions can be predicted using the fuel's composition, vapor-liquid equilibrium theory and activity coefficients.

When dealing with a gas mixture the different physical properties of each constituent, such as the size, shape, polarization, binding energy, and the diffusion kinetics, are be considered. Effective reversible adsorption and desorption of the gas mixture on an adsorbent might be challenged by the presence of specific constituents. The adsorbent's stability through adsorption-desorption cycles is critical for vehicular applications as it affects the in-use service life of an evaporative emissions system. Adsorbents with pore size distribution tailored to the molecules to be adsorbed are sought for application in an evaporative emissions system. Activated carbons have traditionally wide range pore size distribution while MOFs have theoretically uniformed pore structures with narrow pore size distributions.

The use of a flexible MOF as described herein allows tuning of the pore aperture size for adsorption and for desorption to achieve the desired properties for selectively adsorbing and desorbing desired components of a gas mixture, e.g., VVOCs such as n-butane.

The design of an adsorbent requires having a full understanding of the adsorbent structure including pore size/shape, and other adsorbate properties. In this embodiment, the adsorbates are hydrocarbon molecules that adhere to the surface by weak attractive interactions referred to as van der Waals forces. Adsorption occurs in pores whose diameter is close to twice the molecular diameter of the molecule being adsorbed which is why pore size distribution within the adsorbent is a determining factor. These are the type of adsorbate characteristics required to better develop material or combination of materials to adsorb molecules contained in headspace composition. The flexible MOF design that is best adapted to adsorb butane has a 2-2.5 nm pore size, in one embodiment, based upon a correlation between the adsorption capacity of n-butane and the pore characteristics previously mentioned.

Another material characteristic which may affect the adsorbate adsorption uptake is the presence of open metal sites. In some MOFs, metal centers are bonded in specific coordination environment leaving the cation in the center open and accessible to the adsorbed gas molecules. Unsaturated metal sites have been shown to enhance certain adsorbate affinities compared to non-open metals.

Pores sizes are selected to provide easy diffusion paths for the adsorbate molecules to be desorbed from and diffuse out of the pore network. Pores potentially too small are not desired as they are likely to trap large molecules, resulting in a decrease in storage capacity over time.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. An air intake system for an internal combustion engine, comprising:

a vapor capture element disposed in an interior portion of an air intake system;

the vapor capture element connected to a source of a control stimulus;

the vapor capture element being a flexible Metal Organic Framework (MOF) material, the flexible MOF material reversibly controllable in a first state and a second state in response to the control stimulus; and the flexible MOF material configured to adsorb hydrocarbon vapor in the first state and configured to desorb the hydrocarbon vapor in the second state.

2. The air intake system of claim 1, wherein the control stimulus comprises partial pressure.

3. The air intake system of claim 1, wherein the control stimulus comprises temperature.

4. The air intake system of claim 1, wherein the control stimulus comprises light intensity.

5. The air intake system of claim 1, wherein the control stimulus comprises an electrical signal.

6. The air intake system of claim 1, wherein the control stimulus comprises an electro-magnetic signal.

7. The air intake system of claim 1, wherein the flexible MOF material being configured to adsorb hydrocarbon vapor in the first state and desorb the hydrocarbon vapor in the second state comprises the flexible MOF material being configured to transform to having tightly arranged, small pores that are capable of adsorbing the hydrocarbon vapor in the first state, and the flexible MOF material being configured to transform to having loosely arranged, large pores capable of desorbing hydrocarbon vapor in the second state.

8. The air intake system of claim 1, wherein the flexible MOF material comprises a hybrid organic-inorganic material that is assembled by connection of secondary building blocks employing rigid organic ligands.

9. The air intake system of claim 8, wherein the secondary building blocks comprises metal oxide clusters.

10. The air intake system of claim 8, wherein the flexible MOF material comprises one of MIL-53 Al, MIL-88 series, ZIF-8, or Co(bdp).

11. The air intake system of claim 1, wherein the vapor capture element disposed in the interior portion of the air intake system comprises the vapor capture element disposed on a wall of an air filter housing.

12. The air intake system of claim 1, wherein the vapor capture element disposed in the interior portion of the air intake system comprises the vapor capture element disposed upstream of an air filter element.

13. The air intake system of claim 1, wherein the vapor capture element disposed in the interior portion of the air intake system comprises the vapor capture element disposed downstream of an air filter element.

14. The air intake system of claim 1, wherein the vapor capture element includes a planar surface, and wherein the vapor capture element is disposed in the interior portion of the air intake system with an orientation of the planar surface that is parallel to a direction of an airflow path in the air intake system.

15. An air intake system for an internal combustion engine, comprising:

a vapor capture element disposed in an interior portion of an air intake system, and a controller;

wherein the vapor capture element is fabricated from a flexible Metal Organic Framework (MOF) material, wherein the flexible MOF material is reversibly controllable;

wherein the controller is operatively connected to the vapor capture element;

wherein the controller generates a control stimulus that is communicated to the vapor capture element, wherein the control stimulus includes a first state and a second state;

wherein the flexible MOF material is configured to adsorb hydrocarbon vapor in response to the control stimulus being in the first state; and wherein the flexible MOF material is configured to desorb hydrocarbon vapor in response to the control stimulus being in the second state.

16. The air intake system of claim 15, wherein the control stimulus comprises an electrical signal.

17. The air intake system of claim 15, wherein the flexible MOF material being reversibly controllable comprises the flexible MOF material being configured to transform to having tightly arranged, small pores that are capable of adsorbing the hydrocarbon vapor in response to the control stimulus being in the first state, and the flexible MOF material being configured to transform to having loosely arranged, large pores capable of desorbing hydrocarbon vapor in response to the control stimulus being in the second state.

18. The air intake system of claim 15, wherein the flexible MOF material comprises a hybrid organic-inorganic material that is assembled by connection of secondary building blocks employing rigid organic ligands.

19. The air intake system of claim 18, wherein the secondary building blocks comprises metal oxide clusters.

20. The air intake system of claim 15, wherein the flexible MOF material comprises one of MIL-53 Al, MIL-88 series, ZIF-8, or Co(bdp).

* * * * *